(12) United States Patent
Wood et al.

(10) Patent No.: US 11,170,037 B2
(45) Date of Patent: Nov. 9, 2021

(54) METHOD FOR CREATING VIEW-BASED REPRESENTATIONS FROM MULTIMEDIA COLLECTIONS

(71) Applicant: Kodak Alaris Inc., Rochester, NY (US)

(72) Inventors: Mark D. Wood, Penfield, NY (US); Madirakshi Das, Penfield, NY (US); Peter O. Stubler, Chili, NY (US)

(73) Assignee: KODAK ALARIS INC., Rochester, NY (US)

( * ) Notice: Subject to any disclaimer, the term of this patent is extended or adjusted under 35 U.S.C. 154(b) by 184 days.

(21) Appl. No.: 14/736,917

(22) Filed: Jun. 11, 2015

(65) Prior Publication Data

US 2015/0363409 A1    Dec. 17, 2015

Related U.S. Application Data

(60) Provisional application No. 62/010,781, filed on Jun. 11, 2014.

(51) Int. Cl.
| | | |
|---|---|---|
| *G06F 16/583* | (2019.01) | |
| *G06F 16/44* | (2019.01) | |
| *H04L 12/58* | (2006.01) | |
| *G06F 16/538* | (2019.01) | |

(52) U.S. Cl.
CPC ............ *G06F 16/44* (2019.01); *G06F 16/583* (2019.01); *G06F 16/538* (2019.01); *H04L 51/32* (2013.01)

(58) Field of Classification Search
CPC ............... G06F 17/30598; G06F 16/21; G06F 16/2255; G06F 16/9014; G06F 32/645; G06F 16/4393; G06F 16/583; G06F 16/44; G06F 16/538; G06F 16/50; G06Q 10/0833; H04L 9/3247
See application file for complete search history.

(56) References Cited

U.S. PATENT DOCUMENTS

| | | |
|---|---|---|
| 5,781,650 A | 7/1998 | Lobo et al. |
| 6,282,317 B1 | 8/2001 | Luo et al. |
| 6,351,556 B1 | 2/2002 | Loui et al. |
| 6,480,840 B2 | 11/2002 | Zhu et al. |
| 6,504,951 B1 | 1/2003 | Luo et al. |
| 6,606,411 B1 | 8/2003 | Loui et al. |
| 6,697,502 B2 | 2/2004 | Luo |
| 6,940,545 B1 | 9/2005 | Ray et al. |
| 7,110,575 B2 | 9/2006 | Chen et al. |
| 7,362,919 B2 | 4/2008 | Das et al. |
| 7,711,145 B2 | 5/2010 | Gallagher |
| 7,889,794 B2 | 2/2011 | Luo et al. |

(Continued)

*Primary Examiner* — Vaishali Shah
(74) *Attorney, Agent, or Firm* — Hogan Lovells US LLP

(57) ABSTRACT

A system that is capable of generating a multiplicity of representations from a set of multimedia objects, each with a potentially different form, is disclosed. In addition, a system that is capable of generating representations that include thematic groupings in addition to the traditional purely sequential groupings is disclosed. Analysis of metadata to generate derived metadata creates a more comprehensive repository of information about media assets. Using the abundance of metadata, embodiments of the methods disclosed teach uniquely grouping and prioritizing media assets into a storyboard, which is in turn mapped onto view-based representations based on a selected output modality.

26 Claims, 10 Drawing Sheets

(56) References Cited

U.S. PATENT DOCUMENTS

| | | | |
|---|---|---|---|
| 8,135,221 B2 | 3/2012 | Jiang et al. | |
| 8,135,684 B2 | 3/2012 | Fedorovskaya et al. | |
| 8,315,463 B2 | 11/2012 | Gallagher et al. | |
| 8,330,830 B2 | 12/2012 | Manico et al. | |
| 8,611,677 B2 | 12/2013 | Das et al. | |
| 8,625,904 B2 | 1/2014 | Das et al. | |
| 2004/0179719 A1 | 9/2004 | Chen et al. | |
| 2005/0105775 A1 | 5/2005 | Luo et al. | |
| 2005/0105776 A1 | 5/2005 | Luo et al. | |
| 2006/0126944 A1 | 6/2006 | Loui et al. | |
| 2007/0008321 A1* | 1/2007 | Gallagher | G06F 17/30265 345/473 |
| 2007/0098303 A1 | 5/2007 | Gallagher et al. | |
| 2009/0265334 A1* | 10/2009 | Narayanan | G06F 16/58 |
| 2010/0124378 A1* | 5/2010 | Das | G06F 17/30247 382/225 |
| 2010/0142833 A1* | 6/2010 | Ishizawa | G06F 3/0482 382/224 |
| 2013/0051670 A1* | 2/2013 | Das | G06F 17/30056 382/170 |
| 2014/0241627 A1* | 8/2014 | Yamamoto | G06F 17/30247 382/165 |
| 2014/0282192 A1* | 9/2014 | Grossman | G06F 3/0484 715/771 |
| 2014/0333776 A1* | 11/2014 | Dedeoglu | H04N 7/181 348/159 |
| 2015/0296178 A1* | 10/2015 | Aarrestad | H04N 7/15 348/14.16 |
| 2016/0224671 A1* | 8/2016 | Jung | G06F 17/30091 |
| 2016/0283793 A1* | 9/2016 | Leckey | G06K 9/00221 |

\* cited by examiner

METHOD FOR CREATING VIEW-BASED REPRESENTATIONS FROM MULTIMEDIA COLLECTIONS

CROSS-REFERENCE TO RELATED APPLICATIONS

This application is a non-provisional of, and claims priority to, U.S. Application No. 62/010,781, filed Jun. 11, 2014, which is hereby incorporated by reference in its entirety.

FIELD OF THE INVENTION

This invention pertains to multimedia authoring methods, systems, software, and product distribution media. A particular embodiment of the present invention automatically generates one or more view-based representations of a user's stored media files.

BACKGROUND OF THE INVENTION

In recent years, there has been a proliferation of low cost and high quality digital capture devices such as digital cameras, smart phones, and camera phones. These devices are capable of recording both still and motion (or video) digital images. Many of these devices incorporate wireless network access; touch screen interfaces; low-cost internal, removable, and network-accessible image storage; and various sensors to monitor the motion, orientation, and location of the device. These features have enhanced the opportunities for picture taking and have reduced the effort and expense of photography to the point where users are now amassing vast collections of digital images. Viewing the media assets in these ever-growing collections has become increasingly difficult due to the sheer volume of content. In addition, with collections that include thousands of still image and video files, selecting and presenting desired subsets of the collections becomes a formidable task for the average consumer interested in generating a photo product, such as a collage, photo album, calendar, poster or the like.

A variety of commercial offerings exist in the marketplace for automatically taking a set of multimedia assets and creating a specific photo product, such as an 8×10 photo album. Some of these offerings are even capable of choosing a subset of the assets if the entire set is too large for the desired photo product. However, these solutions typically require the consumer to start the process all over if they wish to go from one output modality, or output format, to another output modality, such as from an 8×10 photobook to an 8×12 photobook. Typically, the consumer must specify at the beginning of the process the desired output product form, or modality. Even if these solutions automate or partially automate the process of identifying a subset of assets and determining how the assets should be broken up into pages—if required by the desired output modality—changing the product form, or modality, will require redoing much of the work in determining what assets go onto what pages. Moreover, current solutions typically do not reflect the creativity that consumers often like to see represented in photobook creations. Commercial offerings typically only order photos sequentially, either based on chronology or upload order. However, consumers often like to create photobooks that may only loosely follow chronological order. For example, a manually created photobook may often have one or more pages that are dedicated to a particular theme, wherein multimedia assets associated with the theme are accumulated at various times.

There remains a need in the art for a system that is capable of generating a multiplicity of representations from a set of multimedia objects, each with a potentially different form. In addition, a system is needed that is capable of generating representations that include thematic groupings in addition to the traditional purely sequential groupings.

SUMMARY OF THE INVENTION

The present invention is related to a method of creating one or more view-based representations from a set of multimedia assets comprising the steps of: using a processor to analyze the multimedia assets and corresponding metadata to generate derived metadata; applying a selected method to analyze recorded and derived metadata; ordering and grouping the set of multimedia objects according to the analyzed metadata; prioritizing the assets of the set of multimedia assets according to the analyzed metadata; selecting an output modality; and generating a view-based representation of the set of multimedia assets according to the ordering, grouping, prioritization data, and selected output modality. The method may further comprise the step of saving the ordering, grouping, and prioritization data independently of the elected output modality. The grouping consists of one or more of the following techniques: chronology, frequent itemset mining, face detection, face recognition, location clustering, object detection, object recognition, event detection, and event recognition. The view-based representation may comprise computing an emphasis score for members of the set of multimedia objects.

The selected modality includes a multimedia presentation, an interactive multimedia presentation, a photobook, a printed collage, a virtual collage, or a digital slide show. The ordering, grouping, and prioritization may be persisted independently of the view modality. The views in the view based representation of the set of multimedia objects for the selected modality are determined by the ordering and grouping. An aspect of the present invention also provides a graphic user interface that incorporates a visual representation of the ordering and grouping of the set of multimedia objects according to said analysis. The graphic user interface provides a description or indication of size for the groupings.

The present invention also provides a method of generating one or more view-based representations of an output modality for multimedia assets comprising: a processor analyzing recorded metadata and user-provided metadata associated with multimedia assets of a multimedia collection; the processor generating derived metadata based on the recorded metadata and the user-provided metadata; the processor organizing the media assets in one or more groupings; the processor prioritizing the media assets in each grouping; the processor prioritizing the one or more groupings; the processor generating a storyboard; mapping the storyboard as one or more view-based representations according to a selected output modality; and rendering on a display the one or more view-based representations.

It is to be understood that the attached drawings are for purposes of illustrating the concepts of the invention and may not be to scale.

DETAILED DESCRIPTION OF THE INVENTION

The invention is inclusive of combinations of the aspects of the present invention described herein. References to "a particular aspect" and the like refer to features that are present in at least one embodiment of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
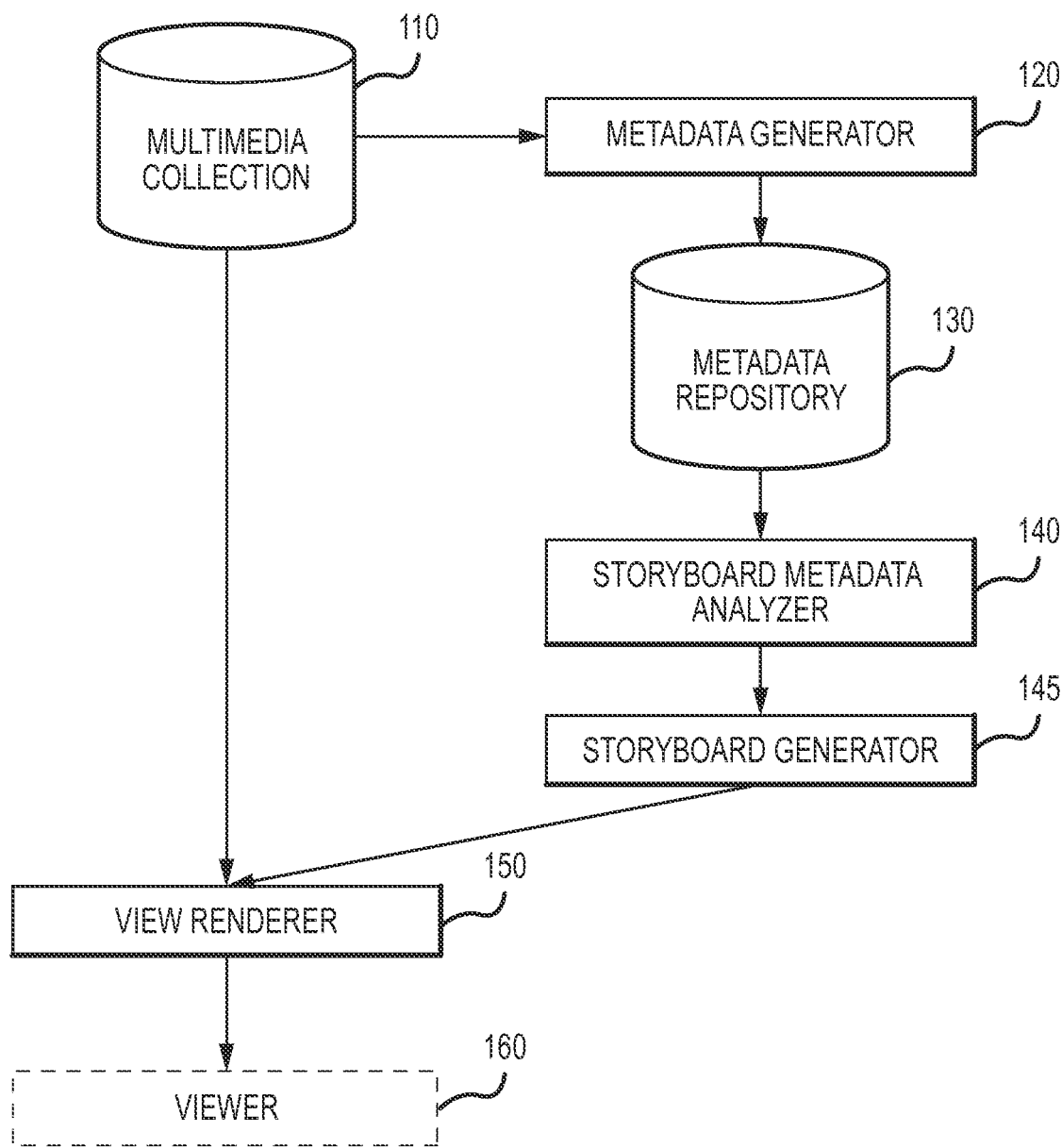
FIG. 1 illustrates a system for generating view-based representations from a collection of multimedia assets.

FIG. 1 illustrates a system for creating view-based representations from a collection of multimedia assets. The system includes a multimedia collection 110, which comprises one or more still images or video objects. It should be understood that the terms "multimedia asset," "media asset," and "asset" each include still images and video objects, individually or collectively, as the case may be. Multimedia assets in the multimedia collection 110 are typically stored as files and may be stored in any of the formats common to the industry, such as JPEG for still images and MP4 for video. Multimedia collection 110 may reside on any computing device or storage device owned by the user, such as, but not limited to, a laptop computer, a desktop computer, a personal cloud storage device, or a smart phone. Multimedia collection 110 may alternatively be stored in a public cloud service such as Google® Drive or Dropbox, or a social media platform such as Facebook® or Flickr®. The metadata generator 120 analyzes assets in multimedia collection 110 to generate derived metadata. Derived metadata is stored in metadata repository 130. Note that along with derived metadata, metadata repository 130 may also store previously recorded metadata and metadata explicitly provided by users of the system. Previously recorded metadata includes, for example, metadata that an image capture device automatically tags, or associates, with a media asset at the time the media asset is captured. Metadata repository 130 may be implemented using any of the variety of techniques common to those skilled in the art, including, but not limited to, relational databases.

According to one aspect of the present invention, all metadata from the assets in multimedia collection 110 (including captured metadata, user-provided metadata, and derived metadata) is stored in a single file according to the Resource Description Framework (RDF) data model defined by the World Wide Web Consortium (W3C). Some or all of the derived metadata may also be recorded in the media assets themselves; for example, the XMP format defined by Adobe® provides a way to store RDF-based metadata within media assets. Some derived metadata may be associated with a set of media assets, as opposed to a specific media asset. A feature of the present invention supports metadata associated both with specific media assets, as well as sets of assets corresponding to higher level abstractions, such as events, places, and people.

Metadata, in general, encompasses data that is stored and associated with a media asset. As mentioned previously, metadata includes recorded or previously recorded metadata, which is recorded by the capture device—e.g., capture time, date, and location provided by a digital camera. Metadata also encompasses user-provided metadata, such as that provided via a user interface located on the image capture device or via an image editing application interface that may be accessed through a remote computer. Lastly, metadata encompasses derived metadata, such as metadata computed by face detection or event classification algorithms that are applied to media assets post-capture.

Derived metadata can be generated at the time of storing media asset files on a computer. It can also be generated or derived automatically without a user's knowledge by programmed operation of appropriate metadata-generating software. Such software may be capable of generating many types of metadata based on extrapolating existing metadata (i.e., recorded metadata and user-provided metadata) or making inferences from the same. For example, a family tree may be inferred given sufficient existing metadata for known family members who are depicted in stored image media collections. Derived metadata includes metadata deduced from existing metadata of any type. All metadata, whether input by a user, provided by a recording apparatus, or derived by a computer system, can be used by the one embodiment of the system to generate additional metadata based on inferences that can be determined from existing metadata.

EXIF data (Exchangeable Image File format for digital still cameras: EXIF Version 2.2, JEITA CP-3451, Japan Electronics and Information Technology Industries Association, April 2002) is an example of metadata generated by a recording device, which is stored with the captured media asset. For example, a digital camera might include various camera settings associated with an image such as f-stop, speed, and flash information. Such camera-generated data, or recorded metadata, may also include GPS data indicating geographic location related to where an image was captured.

Temporal event clustering of still images and videos is generated by automatically sorting, segmenting, and clustering an unorganized set of media assets into separate temporal super events, events, and sub-events, as described in detail in U.S. Pat. No. 6,606,411, entitled "A Method For Automatically Classifying Images Into Events," issued on Aug. 12, 2003, and U.S. Pat. No. 6,351,556, entitled "A Method For Automatically Comparing Content Of Images For Classification Into Events," issued on Feb. 26, 2002. In an embodiment of the present invention, temporal event clustering is performed as part of generating metadata. The prior art references listed in this paragraph and the following paragraphs are hereby incorporated by reference in their entirety.

A growing number of digital cameras, and many smartphones, are capable of recording the latitude and longitude of the image capture location when an image is captured. Such location-based metadata can be very powerful especially when used in concert with other metadata sources. For example, the U.S. Geological Survey's Board on Geographical Names maintains the Geographic Names Information System, which provides a means to map latitude and longitude coordinates to commonly recognized feature names and types. Exemplary location types include "church," "park," and "school." Location metadata may also be used to aid in clustering assets. One embodiment of the present invention can use a system like the Geographic Names Information System to generate derived metadata in the form of location types upon analyzing recorded metadata in the form of latitude and longitude values recorded by the image capture device. For example, a media asset captured in New York's Central Park could have recorded metadata in the form of latitude and longitude values (40.7789° N and 73.9675° W). Metadata generator 120 analyzes the recorded metadata (the latitude and longitude values) to generate derived metadata for that asset in the form of the name of the location—i.e., Central Park. Location-based data as described in U.S. Patent Application Publication No. US 2006/0126944, entitled "Variance-Based Event Clustering," filed on Nov. 17, 2004, can include cell tower locations, GPS coordinates, and network router locations.

Scene classifiers identify or classify a scene into one or more scene types (e.g., beach, indoor, etc.) or one or more activities (e.g., running, swimming, eating, etc.). Scene classifying methods may also be applied to media assets to generate derived metadata. Details of such methods are described in U.S. Pat. No. 6,282,317, entitled "Method for Automatic Determination of Main Subjects in Photographic Images"; U.S. Pat. No. 6,697,502, entitled "Image Processing Method for Detecting Human Figures in a Digital Image Assets"; U.S. Pat. No. 6,504,951, entitled "Method for Detecting Sky in Images"; U.S. Patent Application Publication No. US 2005/0105776, entitled "Method for Semantic Scene Classification Using Camera Metadata and Content-Based Cues"; U.S. Patent Application Publication No. US 2005/0105775, entitled "Method of Using Temporal Context for Image Classification"; and U.S. Patent Application Publication No. US 2004/003746, entitled "Method for Detecting Objects in Digital Image Assets."

Materials class features provide an indication of various materials (e.g., water, grass, snow etc.) included in the digital image. In one embodiment, the materials class features are determined using a supervised learning approach, such as that described by Carneiro et al. in the article entitled "Supervised Learning of Semantic Classes for Image Annotation and Retrieval" (IEEE Transactions on Pattern Analysis and Machine Intelligence, Vol. 29, pp. 394-410, 2007). Determining materials class features is yet another aspect of the present invention that may be implemented to generate further derived metadata. Another method for determining materials class features that can be used in accordance with the present invention is described by Boutell et al. in the article "Learning Multi-label Scene Classification" (Pattern Recognition, Vol. 37, pp. 1757-1771, 2004). This method by Boutell et al. is designed to determine materials class features for digital images that can contain multiple materials classes, such as water, sand, and blue sky which might appear together in a beach scene. The method for detecting sky in an image as described in U.S. Pat. No. 6,504,951, to Luo et al., entitled "Method for Detecting Sky in Images" can also be used to determine materials class features in some embodiments.

Low-level image features provide an indication of the visual content of an image. Low-level image features are those computed directly from the pixel content of the image, such as, but not limited to, the colors, the textures, or the edge information. Low-level image features are useful for determining the similarity of appearance between two images. To ensure that the detected colors match the perceived color regions in the digital image, spatially coherent color regions in the digital image are identified. U.S. Pat. No. 6,480,840, to Zhu et al., entitled "Method and Computer Program Product for Subjective Image Content Similarity-based Retrieval," describes determining color features from an image based on the assumption that significantly-sized, coherently-colored regions of an image are perceptually significant. Accordingly, a coherent color histogram is first computed for an image that provides an indication of the number of pixels of a particular color that belong to coherently colored regions. Dominant colors are then determined that occupy a significant proportion (according to a pre-defined threshold) of the overall pixels. Color classifiers characterize the dominant colors present in an image. U.S. Pat. No. 6,480,840 also describes the determination of texture features that can be used for low-level features in accordance with the present invention.

Content-based Image Retrieval (CBIR) techniques retrieve images from a database that are similar to an example (or query) image, as described in detail in U.S. Pat. No. 6,480,840. The algorithms that are used to enable CBIR may also be used to generate metadata indicating image similarity based on low-level image features. This concept can be extended to portions of images or Regions of Interest (ROI). The query for similar images can target either whole prospective similar images or a portion (ROI) of prospective similar images. In other words, images retrieved using CBIR techniques match the query image either as a whole image match or contain an ROI matching a corresponding ROI in the query image. In the context of the current invention, CBIR may be used to identify assets that are similar to some other identified asset.

Facial features in images are detectable and indicate the presence of human faces. Methods for detecting human faces are well known in the art of digital image processing. For example, a face detection method that can be used in accordance with the present invention is described by Jones et al. in the article entitled "Fast Multi-view Face Detection" (Mitsubishi Electric Research Laboratories, TR2003-96, 2003). Facial features that can be computed from various face detection methods include the number of faces in the image and the approximate sizes and locations of faces in the digital image. One feature of the present invention optimizes the methods for detecting faces and analyzing facial features to generate derived metadata.

In some embodiments, the facial images can be analyzed to determine additional information about the people appearing in the images, such as estimated age and gender of the persons in the image. A method for assigning a face to an age category may be implemented in the present invention, where the details of such a method are described in U.S. Pat. No. 5,781,650, entitled "Automatic Feature Detection and Age Classification." The method uses ratios of facial measurements that are known to change with age due to bone structure development. Also, U.S. Pat. No. 7,362,919, entitled "Method for Generating Customized Photo Album Pages and Prints Based on People and Gender Profiles" describes a method for determining the gender of a detected face using facial measurements and facial textures that are known to be different between the genders. Face detectors are also described in U.S. Pat. No. 7,110,575, entitled "Method for Locating Faces in Digital Color Images," issued on Sep. 19, 2006; U.S. Pat. No. 6,940,545, entitled "Face Detecting Camera and Method," issued on Sep. 6, 2005; and U.S. Patent Application Publication No. US 2004/0179719, entitled "Method and System for Face Detection in Digital Image Assets," filed on Mar. 12, 2003.

There are also commercially available software products (from companies such as Omron, Luxand, ArcSoft etc.) and open-source software products (such as OpenCV, Intel Perceptual Computing and bob) for face detection and characterization. These products can be used for obtaining face-based metadata features, such as a count of the number of faces in the image, approximate sizes of faces, locations of faces, age and gender of faces, and people recognized as the same person across images.

Face recognition is the identification or classification of a face to an example of a person or a label associated with a person based on facial features as described in U.S. Pat. No. 8,315,463, entitled "User Interface for Face Recognition," issued Nov. 20, 2012; U.S. Pat. No. 7,711,145, entitled "Finding Images With Multiple People or Objects," issued May 4, 2010; and U.S. Patent Application Publication No. U.S. 2007/0098303, entitled "Determining a Particular Person from a Collection," published on May 3, 2007.

Face clustering is a form of face recognition wherein faces are grouped by similarity. With face clustering faces that appear to represent the same person are associated together and given a label, but the actual identity of the person is not necessarily known. Face clustering uses data generated from facial detection and feature extraction algorithms to group faces that appear to be similar. This selection may be triggered based on a numeric confidence value. The output of the face clustering algorithm is new metadata: namely, a new object representing the face cluster is created. Each media asset containing a face that is part of the face cluster receives a metadata item indicating that the asset contains a person as represented by the face cluster. In some embodiments, the system may be able to associate the face cluster with an identified person, either by the user providing the facial identification or by consulting some auxiliary data source that provides exemplar faces for a given person.

Detected events may be classified into a semantic category such as birthday, wedding, etc., as described in detail in U.S. Patent Application Publication No. U.S. 2007/0008321, entitled "Identifying Collection Images With Special Events," filed on Jul. 11, 2005. In one embodiment of the present invention, detecting events serves to expand the library of derived metadata stored in metadata repository 130. Media assets can be associated with one another because they depict the same event. Such media assets may be classified together as depicting the same event because they share the same location, setting, or activity per a unit of time, and are intended to be related, according to the expected intent of the user or group of users. Within each event, media assets can also be clustered into separate groups of relevant content called sub-events. While media assets may be generally classified as depicting the same event because they share the same setting or activity, media assets in a sub-event share more specific similar content within the event. For example, assets may be classified in a sub-event because they were captured at roughly the same time and optionally have some measure of visual similarity.

In U.S. Pat. No. 8,611,677, issued Dec. 17, 2013, Das et al. have described a method for classifying images or videos in a multimedia collection into one of several event categories using a combination of time-based and content-based features. Video concept classification is described in U.S. Pat. No. 8,135,221, which issued on Mar. 13, 2012, to Jiang et al. Multiple events themselves may also be clustered into larger groups called super-events. U.S. Pat. No. 8,611,677 also describes a method for computing super-events from the output of event clustering using a density-based clustering approach. As an example of the different event categories, consider a weekend vacation trip with morning, afternoon, and evening activities each day. Each of the different activities might constitute a separate sub-event, with the sub-events of a day collectively constituting an event and the entire weekend constituting a super-event. In view of this example, it should be understood that the exact grouping will depend on the capture time of the various assets and how they are clustered.

An image value index (IVI) is defined as a measure of the degree of importance (significance, attractiveness, usefulness, or utility) that an individual user might associate with a particular asset. An IVI score can be a stored rating entered by a user as metadata. User-provided metadata in the form of importance rankings, or significance rankings, are described in detail in U.S. Pat. No. 8,135,684, entitled "Value Index from Incomplete Data"; and in U.S. Pat. No. 8,330,830, entitled "Camera User Input Based Image Value Index." Automatic IVI algorithms can utilize image features, such as sharpness, lighting, and other indications of quality. Camera-related metadata (exposure, time, date etc.), image understanding (skin or face detection and size of skin/face area), or behavioral measures (viewing time, magnification, editing, printing, or sharing) can also be used to calculate an IVI for any particular media asset. Various types of IVI metrics are described in the paper entitled "Multidimensional Image Value Assessment and Rating for Automated Albuming and Retrieval," $15^{th}$ IEEE International Conference on Image Processing, 2008, by Loui et al. In particular, this paper describes a technical IVI metric based upon technical characteristics of an image as well as a facial IVI metric based upon characteristics of detected faces in an image.

Video key frame extraction is the process of extracting key-frames and/or a salient shot, scene, or event, and the associated audio to provide a summary or highlight of a video sequence. Video key frame extraction is described in detail in U.S. Pat. No. 7,889,794, entitled "Extracting Key Frame Candidates from Video Clip."

The growing prominence of social platforms such as Facebook® and Instagram® provide new sources of user-provided metadata, based upon how media objects are used and shared. For example, Facebook® is a widely used social network that provides a means for users to upload and share images and video objects, with optional titles or captions. The fact that a user has even shared a media object indicates that the object has greater value to the user. Facebook® further provides a means for people with whom media objects are shared to comment on the object or to express interest in the object by "liking" it. In addition, Facebook® users can tag people within images. All this information about media assets and their usage is accessible to applications via the Facebook® platform API. Other social platforms such as Flickr® and Instagram® provide comparable APIs.

U.S. Pat. No. 8,625,904 describes the computation of various types of metadata and the discretization of feature values into a finite number of levels. This patent also describes a frequent pattern mining step that is used to identify recurring patterns in a metadata database. In one embodiment of the present invention, similar pattern recognition algorithms, or pattern mining methods, are used to identify recurring patterns in the metadata stored in metadata repository 130. The frequent pattern mining step identifies a set of frequent itemsets, where each of the frequent itemsets is a co-occurring feature descriptor group that occurs in at least a predefined fraction of the digital images. Algorithms for frequent itemset mining in a transactional database are well-known in the art. For example, an implementation of the Eclat algorithm, described by Borgelt in the article entitled "Efficient Implementations of Apriori and Eclat" (Proc. of IEEE ICDM Workshop on Frequent Itemset Mining Implementations, 2003), can be used to mine frequent itemsets. The images corresponding to each frequent itemset generally represent a theme in the image collection. For example, a frequent itemset corresponding to the color features "orange" and "red," and time-based features "evening" and "summer," may produce a group of images of sunsets. The frequent itemsets detected depends on the images in the image collection and are not pre-defined.

Figure 2A:
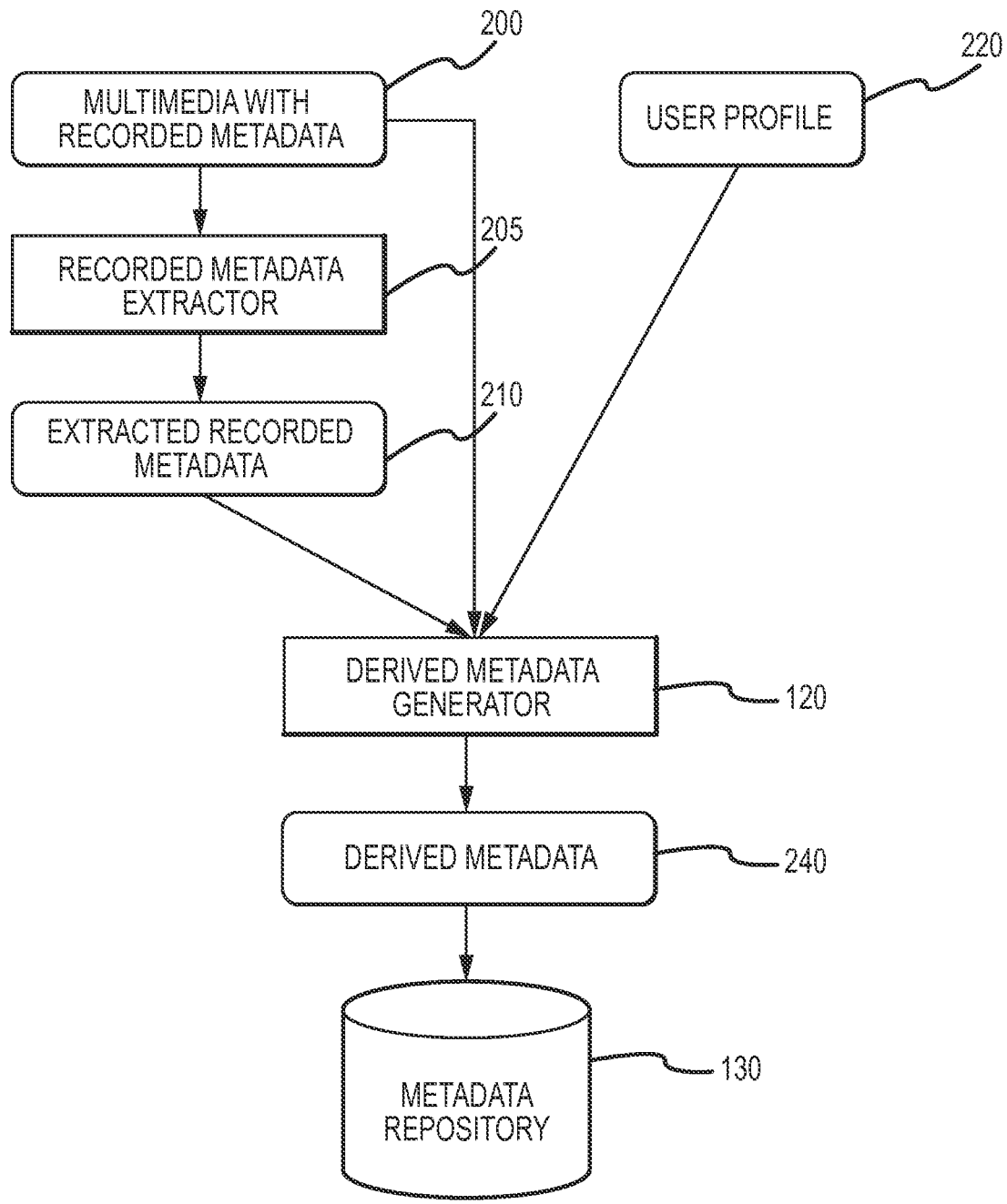
FIG. 2A illustrates the flow from initial metadata to derived metadata.

FIG. 2A illustrates the flow from initial metadata to derived metadata. The term "initial metadata" should be understood to include both recorded metadata and user-provided metadata. The derived metadata generator 230 in FIG. 2A encompasses all the metadata generation algorithms previously described. Metadata recorded and stored with the multimedia assets 200 is extracted by the recorded metadata extractor 205 to produce extracted recorded metadata 210. The input to the derived metadata generator 230 includes the extracted recorded metadata 210, the multimedia assets 200, and user profile information 220. A user profile is essentially metadata about the user or viewer, and enables additional types of metadata to be generated. User profiles for modern media sharing websites and applications, as well as social networking websites and applications, generally require the user to input basic information, including name, gender, age, city of residence etc. When a media asset is associated with a user profile, for example, at least the basic information of the user profile may be included as user-provided metadata. As discussed previously, media sharing websites and applications permit users to add far more user-provided metadata in the form of comments, precise location tags, "likes"—or indications of user interest and preference—and facial identification tags. For example, the user profile could include information about family and friends to aid people recognition. Referring back to FIG. 2A, the derived metadata generator 230 interpolates, extrapolates, combines, and cross-references recorded metadata and user-provided metadata to generate supplemental, derived metadata 240. The output of the derived metadata generator is the set of derived metadata 240, which is stored in the metadata repository 130 of FIG. 1. Metadata repository 130 may provide either short-term or long-term storage capabilities in volatile memory, such as a RAM drive, or in non-volatile memory, such as a mass storage unit, hard drive, ROM, flash memory, optical drive or any other memory known to one skilled in the art.

Figure 2B:
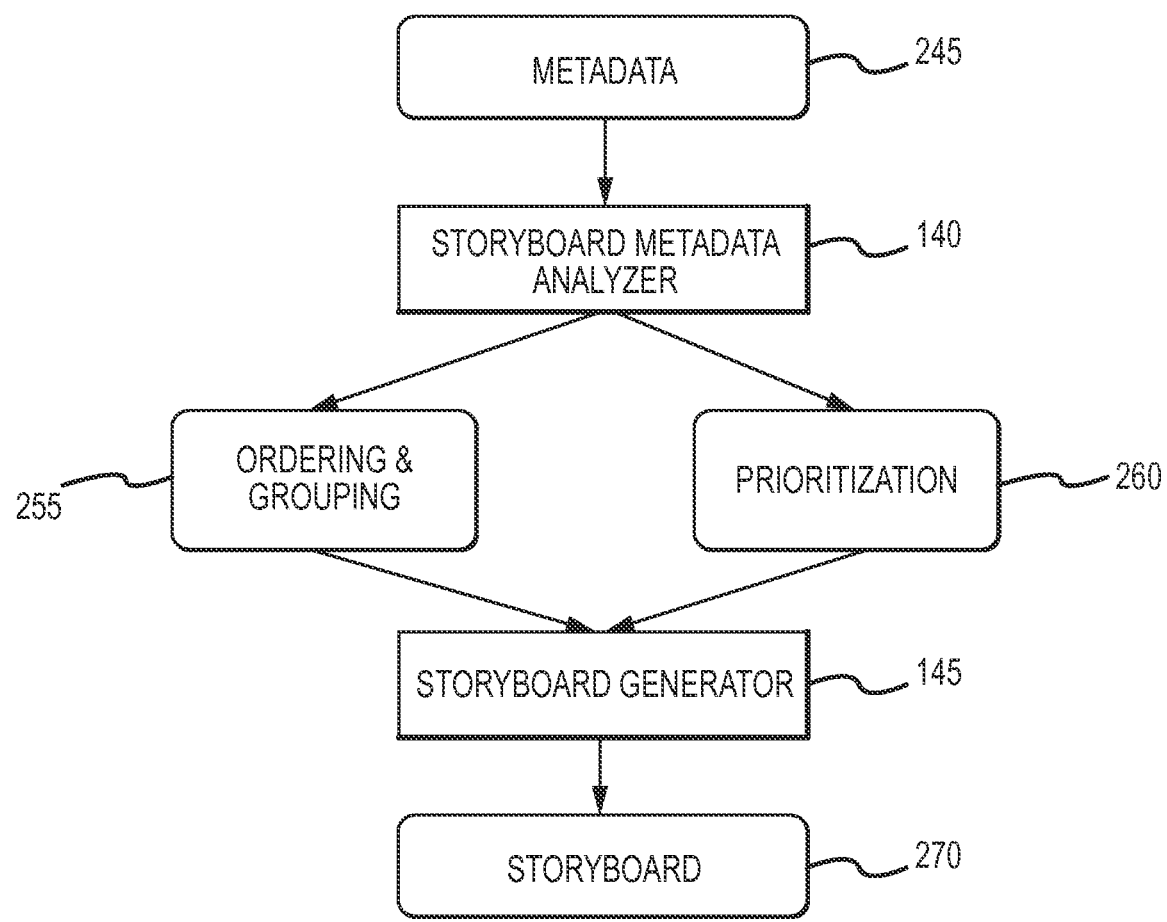
FIG. 2B illustrates how a storyboard is generated from metadata.

With reference to FIG. 2B, given a set of metadata stored in metadata repository 130, the system uses storyboard metadata analyzer 140 and storyboard generator 145 to generate a view-based representation, which is rendered by view renderer 150. According to certain aspects of the present invention, the functionality of storyboard metadata analyzer 140 and storyboard generator 145 may be combined into a single component, with no intermediate output. The system may support a variety of output modalities, or output formats. An output modality is an output form or type in which content is displayed as one or more canvases, pages, slides, wherein multiple canvases, pages, or slides may be displayed in series, or in sequence. For example, a traditional hardcopy photobook is one form of an output modality. Given a particular output modality, such as a hardcopy photobook for example, each page of the photobook may correspond to a separate, independent view-based representation that can be viewed on view renderer 150. However, output modalities are not limited to physical media. A digital slideshow, where one or more media assets are displayed sequentially on a softcopy display, also constitutes an output modality. A digital slideshow may even include video content on one or more slides, where each slide constitutes a view-based representation. For example, a single view may consist of four assets—three pictures and video clip—all displayed simultaneously. The view renderer 150 generates views appropriate for the output modality, i.e., the output form. If the output form is a hardcopy photo album, then the view renderer 150 renders each page to be printed. Softcopy output modalities may be viewed by a user using an optional viewer 160. One embodiment of the present invention also supports viewing previews of hardcopy output pages before they are printed using the viewer 160.

A storyboard representation 270 of the set of multimedia assets is defined as a hierarchical grouped and ordered set of media assets. FIG. 2B illustrates the process of creating a storyboard 270. The storyboard metadata analyzer 140 analyzes all input metadata 245. Input metadata 245 includes all types of metadata previously described: recorded metadata, user-provided metadata, and derived metadata. It is to be understood that metadata 245 in FIG. 2B is the compilation of all metadata associated with the media assets in the multimedia collection, including the derived metadata 240 generated by metadata generator 120. Metadata 245 includes recorded metadata 210, derived metadata 240, and the user-provided metadata associated with user profile 220 from FIG. 2A. Storyboard metadata analyzer 140 outputs ordering and grouping data 255 and prioritization data 260 (or priority data). Storyboard generator 145 gathers and considers ordering and grouping data 255 and prioritization data 260 to generate the final storyboard 270. While FIG. 2B illustrates one way of generating a storyboard, those skilled in the art will recognize that equivalent functionality may be accomplished in a variety of ways, including combining the steps of analyzing the metadata and generating the storyboard into a single step.

The behavior of storyboard metadata analyzer 140 is typically specific to the type of storyboard that is being generated. A storyboard represents a particular way of grouping, ordering, and prioritizing the media assets in multimedia collection 110. One feature of the present invention supports multiple grouping and ordering paradigms, each with its own way for prioritizing objects. For example, another feature supports a chronological paradigm, where the media assets are grouped and organized according to the media capture time. According to a different feature, the storyboard supports a thematic ordering strategy, and yet a further feature provides a combined or hybrid thematic/chronological storyboard. There may even be multiple variations on a single paradigm. For example, the present invention supports a chronological paradigm in which media assets belonging to an event or super-event are summarized, ordered, grouped, and/or prioritized according to a documentary style. An alternative variation is a time-based, or chronological, storyboard that is ordered, grouped, and prioritized so as to select a very small number of representative media assets from distinct time epochs. The latter paradigm could be used to generate storyboards that could in turn be used to generated photo calendars, with a collage for each month showing the best pictures for that month.

Figure 4:
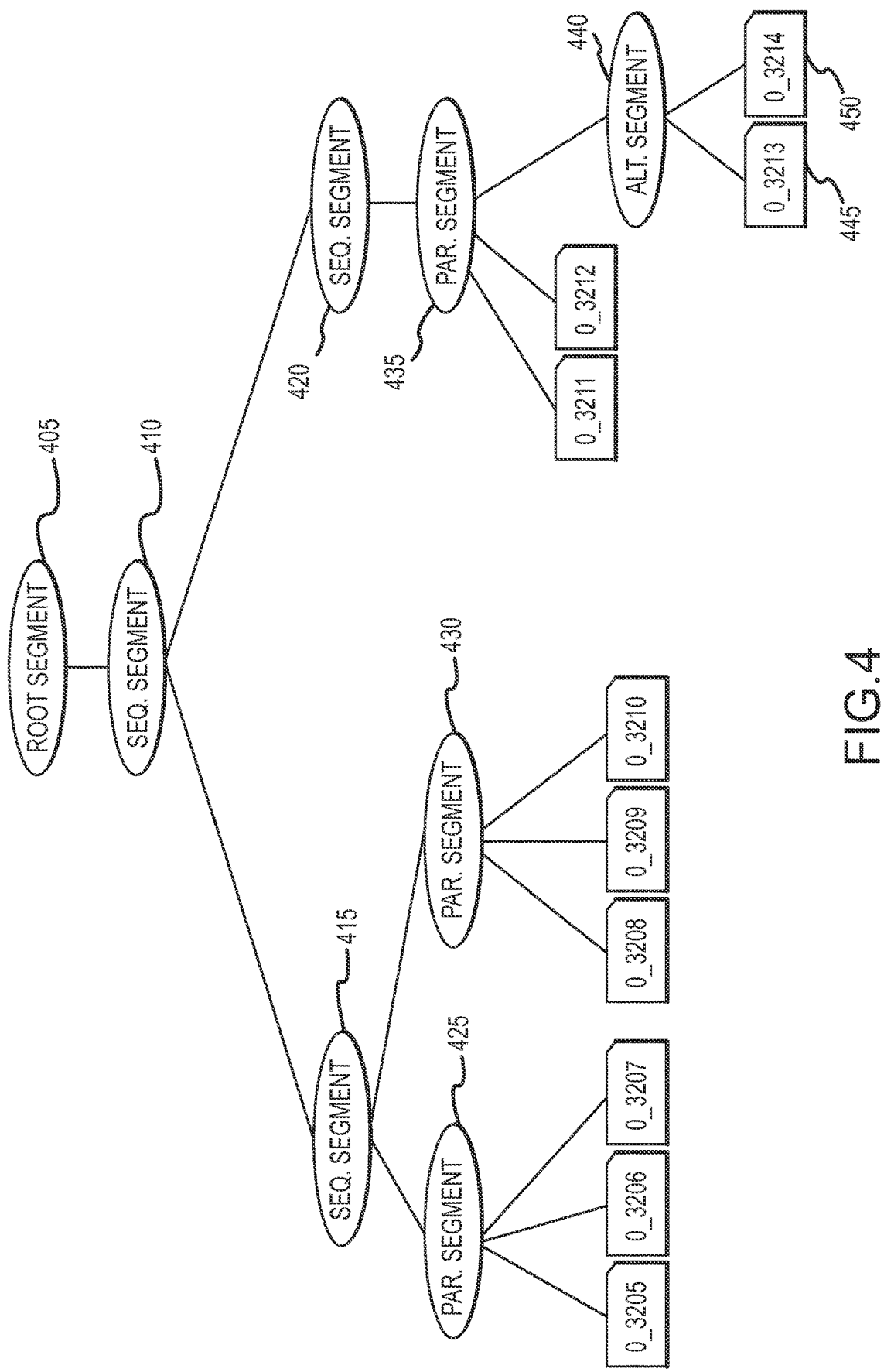
FIG. 4 shows a graphical representation of a storyboard for a set of media assets.

FIG. 4 shows a graphical representation of a storyboard for a set of media assets. The graphical representation of a storyboard groups media assets by groups, or segments, in a tree-structured fashion, where the tree stems from a root segment 405. In this graphical representation of an embodiment of the present invention, groupings of media assets are referred to as segments; the words segment and grouping shall be used interchangeably. The root segment 405 contains a single sequential segment 410, which corresponds to some high-level grouping of the media assets. For example, using the temporal event clustering algorithm described previously, the segment 410 might correspond to a super-event. If the media collection contains multiple super-events (unlike the embodiment depicted in FIG. 4), then the root 405 might contain multiple child nodes, which would be on the equivalent level of the tree structure as sequential segment 410, each corresponding to a different super-event. Segment 410 contains two child nodes 415 and 420, which might represent two different events contained within a containing super-event. Segments 405, 410, 415, and 420 are all sequential segments or groupings, meaning that their children represent content that should be presented in sequential order. Segment 415 contains children segments 425 and 430, which are parallel segments. A parallel segment is one in which the child content may be displayed in parallel. Media assets in parallel segments can be displayed in any arrangement, order, or sequence, with no preference, constraints, or requirements as to presentation. In the context of a storyboard, sequential segments indicate content where the order is important, e.g., where content needs to be shown in chronological order. Parallel segments represent content where the order is not important.

In some cases, respecting chronological order at a fine level, such as the level of sub-events, is not important. For example, consider a family vacation to Washington, D.C., with trips to two different Smithsonian museums on a single day, one in the morning and one in the afternoon. Each trip to the two museums constitutes its own independent sub-event. Users would expect a chronological ordering of the captured media assets to order the morning images before the evening images, and may even expect that the different exhibit areas to be ordered sequentially. However, it is often not necessary that every picture be in strict chronological order; if several pictures were taken at a given exhibit, the user may desire to have the pictures ordered in whatever arrangement results in the most aesthetically pleasing result. According to one aspect of the present invention, sub-events—such as the morning and afternoon museum visits—are mapped to parallel segments by default. This gives the system more flexibility in determining the final view-based representation because there is no constraint on the order of presenting the media assets in a parallel segment. Thus, media assets in parallel segments may be arranged in a manner that makes the best use of spatial constraints of the particular output modality. In the case where a storyboard is mapped to a physical, hardcopy output such as a photobook, images grouped in a parallel segment can be arranged in the manner that is visually most appealing because no one image is more important, or more preferred, than another. However, according to an aspect of the system, it may be preferred to specify that images within a sub-event should be ordered chronologically, in which case the corresponding segment type would be sequential. The system is such that it may support other groupings in addition to the sequential and parallel groupings defined here.

A given storyboard may have many view-based representations that respect the grouping and ordering structure. For example, in FIG. 4, the storyboard could have as a view-based representation a single view corresponding to the entire storyboard; for a hardcopy output modality, that might mean all of the assets appeared as a collage on a single page or spread. The storyboard in FIG. 4 could also have a view-based representation consisting of two views, one corresponding to segment 415 and another corresponding to segment 420; for a hardcopy output modality this might translate to a photobook containing two spreads. Other views are also possible. For example, if segment 425 contains more assets than can fit into a view for a particular output modality—for example, more pictures than can fit on a page or spread—then that segment alone may be represented by multiple views—i.e., multiple pages or spreads. Similarly, if segment 425 contained one or more nested segments—parallel or sequential—then that too could give rise to multiple views. According to an aspect of the present invention, view-based representations correspond to page-based representations. Therefore, sequential segments provide a natural basis for determining how groups are mapped to sequential pages.

In addition to representing, ordering, and grouping information, a storyboard may also include priority information (item 260 computed by metadata analyzer 140 in FIG. 2B). In particular, associated with each multimedia asset in the multimedia collection is a priority reflecting the importance of that asset. Priorities are used to determine which assets are to be included in a particular output modality. The priority for a given asset may be determined as a function of the recorded metadata, the derived metadata, and the user-provided metadata. According to one aspect of the present invention, the priority associated with a given asset is computed to be a number between 0 and 1 inclusive. The specific function used to compute the priority will depend upon the type of storyboard being generated. The final priority may itself be a weighted function of multiple priority scores. An example of a weighted function of multiple priority scores may assign a priority score based upon technical qualities such as sharpness and exposure, as represented for example in the previously mentioned technical IVI score. Alternatively, a separate weighted scoring function may consider the number and appearance of the people portrayed in the image, along with the previously mentioned facial IVI score. For example, images containing people may be scored in part based upon the identity of the people and in part based on the quality of detected faces, such as whether a person is smiling, has their eyes closed, or the face is in focus.

Considering people-based metrics separately from other technical metrics, or giving people-based metrics greater weight than other technical metrics, is often appropriate given that people are often the most important part of consumer photography. In the absence of knowing the actual identity of a person in the media asset, the system may use facial similarity clustering to estimate the frequency a given person appears in a set of images. This feature operates under the assumption that a person that frequently appears in media assets of one or more given collections is more likely to be significant than a person that appears infrequently, as might occur if an extraneous stranger is photographed in the background. A feature of the present invention associates a people importance score with each image, which is computed by first computing a people importance score for each face detected within the image, and then computing an overall score for the image. The people importance score is a measure of the expected significance or importance of each individual detected and recognized using facial clustering within the image. The people importance score is used as another factor in computing the final priority score for an image. While one aspect of the invention may favor images with high people importance score, some other aspects may prefer to strive for a more normal distribution. In particular, if a collection of images contains a disproportionate number of pictures of one person, some embodiments may normalize the distribution by effectively penalizing images in which that one person appears. Because the priority may be ultimately used to determine which assets to include in a particular view-based representation, this type of normalization may be appropriate to ensure that, for example, all family members are equally represented in a particular view-based representation.

Consumer photography frequently includes images that are near duplicates of each other. For example, frequently when shooting pictures of groups of people, the photographer will take multiple pictures in rapid succession in an attempt to get a picture where each person in the group looks their best. More experienced photographers may also manually bracket a shot, which means to capture a scene at several different exposure values; more advanced cameras now include the ability to bracket automatically. Such images may all be considered semantically equivalent in that they represent essentially the same scene at the same moment in time. For a set of semantically equivalent images, an feature of the present invention provides for simply selecting a single representative image to represent the set. In the case of the group shot, the picture where everyone looks their best would be chosen; in the bracketed shots, the image having the best exposure would be chosen. Of course, determining the best or representative image may be difficult to fully automate without a deep understanding of the subject matter. A group shot may contain some people of lesser importance to the user than others, and consequently, the appearance of some people may be weighted less than others. Given sufficient information, this type of decision making may be automated, but it requires not only accurate mechanisms for assessing people's facial expression and overall appearance, but knowledge of the significance or importance of the person to the user. Such importance may be explicitly specified by the user as part of a user profile, or it may be estimated by the system by considering the frequency certain people are portrayed in a given media collection, or by considering external factors such as the user's degree of interaction with the person via social media, for example. Any two pictures captured at distinct moments in time will almost never be visually completely identical. However, by considering the subject matter of the picture—both the people and other objects portrayed—as well as the time and place the images were captured, a system can predict the likelihood the images will be viewed as functionally or semantically equivalent by the user, and therefore of a nature that at most one representative image would want to be included in any final representation.

According to one feature, for reasons of computational efficiency, the system determines semantic equivalence by considering the elapsed time between any two consecutive pictures that appeared within a given sub-event cluster, as well as the visual similarity of the images, as determined by using color block histograms. Other embodiments may incorporate the use of CBIR, as described previously, to identify near-duplicate images. In addition, other embodiments may create a synthesized representative image from a set of semantically equivalent images by taking the best elements of each picture. For example, images with high dynamic range are typically created by combining pictures of the same scene captured at different exposure values. The Microsoft® Group Shot tool provides photographers with a mechanism for creating a synthesized group picture by taking the best versions of people from different photos to create a new image. These types of techniques may be used to generate a representative image of a set of semantically equivalent images, with appropriately populated metadata values.

Referring back to FIG. 4, media assets 445 and 450 are grouped under alternates segment 440. Grouping these media assets in an alternates segment indicates that these two assets are semantically-equivalent, or near duplicates of each other. Priority values associated with each image (not shown) could be used to pick the best image as the representative image from this set.

In a pure event-based or chronological storyboard, the priority associated with a given image may be computed by first ranking assets within sub-events, or some other appropriate grouping, using some combination of people-based and non-people based metrics. This allows the system to compute a normalized priority for each asset. Normalization may be based upon the average priority score for the sub-event. This normalization provides a means to compensate for situations where all pictures within a given sub-event (or other grouping) differ in some way from the overall norm. For example, pictures in a particular sub-event may all appear underexposed due to lightning conditions. Omitting this normalization step might result in all the pictures in the sub-event receiving a lower priority, which might in turn result in that sub-event not being represented in the final view-based representation.

According to an aspect of the present invention, the final priority score is computed for an event-based storyboard as a function of the normalized face-based priority for an image, with further adjustments based upon factors such as whether the user has provided a rating for the image or has manually added captions to the image. Other image usages could also be considered, such as whether the user has previously shared the image using social media, has explicitly edited that image or a property of that image, or otherwise demonstrated an interest in the image. In addition, the priority of images coming from very large sub-events may be adjusted so as to avoid images from such sub-events dominating the final view-based representation.

Figure 3:
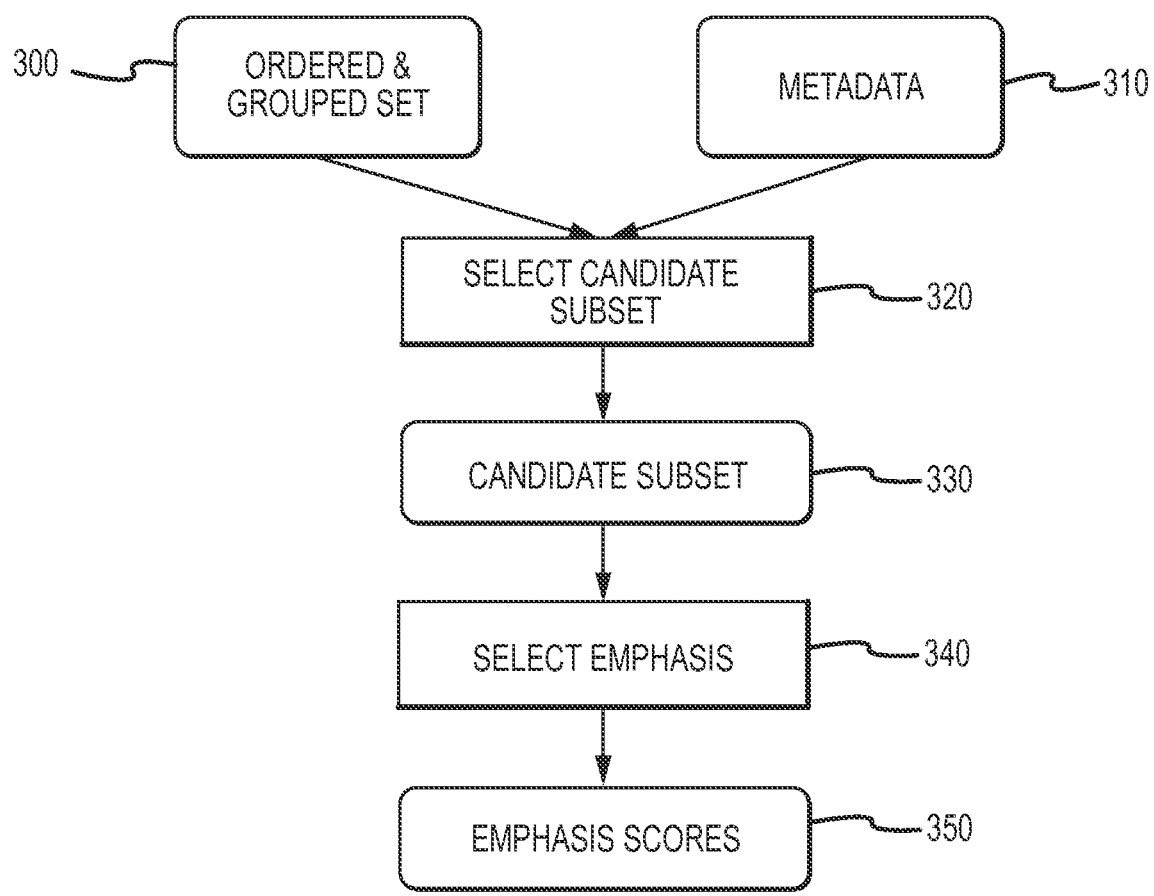
FIG. 3 illustrates an embodiment of the process for computing emphasis scores.

In addition to associating a priority with each image, a feature of the present invention also computes and associates an emphasis score with each image. Whereas the priority score provides a measure of how important an image is, the emphasis score gives a measure of how much space to allocate to an image. The meaning of "space" will depend on the final view representation and output modality. For example, for a hardcopy photobook, if an image has a higher emphasis score, then it should be allocated more space on a page of the photobook. In the instance where the output modality is a digital slideshow or other presentation designed for softcopy output, images having higher emphasis scores are allocated a greater amount of display time relative to images with lower emphasis scores. An example process for computing emphasis scores is shown in FIG. 3. For aesthetic reasons, assets receiving emphasis should be somewhat evenly distributed across the storyboard. For example, if all the assets at the beginning of the storyboard are emphasized, then the emphasis would become diluted, or would be lost altogether. Likewise, if all the assets on a photobook page are emphasized (by each asset receiving larger than average, but similar space allocation on the photobook page), then none of the assets would stand out. The process of determining which assets should receive emphasis takes as input sets of preordered and grouped assets 300 and the associated asset metadata 245 Some embodiments may also consider the priority information. At step 320, the system identifies candidate media assets for receiving emphasis, forming the candidate subset 330. In computing the candidate subset 330, the system considers image-specific criteria, such as the relative importance of people portrayed in the image, any user-provided image rating, and whether the image's IVI scores are above average. At step 340, the actual emphasis scores 350 are computed. The computation is based upon not only ordering and grouping information 300 and metadata 310, but also the segment corresponds to segment 410, and so on. The following XML structure includes a Title element not shown in FIG. 4. An embodiment of the present invention, in addition to determining grouping, ordering, and priority information, also creates special title segments for major groupings, including the entire storyboard. A title segment provides an automatically suggested image or images that can be used, for example, as the cover image of a photo album or a chapter. The system may include a means for automatically generating textual titles to accompany or in lieu of images in title segments. Such textual titles can be automatically generated from metadata. For example, if a segment corresponds to an event that has an associated time and place, the time and place could serve as the title. Another feature of the system also generates textual captions for individual images, again by using metadata associated with individual images, such as time, place, or people identified in the image.

```
<Story>
  <StoryBoard>
    <Segment presentationType="sequential" segmentType="root">
      <Title>
        <AssetRef reference="id-22_3228" />
      </Title>
      <Segment presentationType="sequential" segmentType="super" label="urn:guid:00000000-0000-0000-0000-000000000353">
        <Segment presentationType="sequential" segmentType="event" label="urn:guid:00000000-0000-0000-0000-000000000217">
          <Segment presentationType="parallel" segmentType="sub" label="urn:guid:00000000-0000-0000-0000-000000000218">
            <AssetRef reference="id-0_3205" priority="0.5382" />
            <AssetRef reference="id-1_3206" priority="0.5736" emphasis="1.0" />
            <AssetRef reference="id-2_3207" priority="0.5118" />
          </Segment>
          <Segment presentationType="parallel" segmentType="sub" label="urn:guid:00000000-0000-0000-0000-00000000021C">
            <AssetRef reference="id-3_3208" priority="0.5392" />
            <AssetRef reference="id-4_3209" priority="0.5402" emphasis="1.0" />
            <AssetRef reference="id-5_3210" priority="0.5239" />
          </Segment>
        </Segment>
        <Segment presentationType="sequential" segmentType="event" label="urn:guid:00000000-0000-0000-0000-000000000220">
          <Segment presentationType="parallel" segmentType="sub" label="urn:guid:00000000-0000-0000-0000-000000000221">
            <AssetRef reference="id-6_3211" priority="0.2831" />
            <AssetRef reference="id-7_3212" priority="0.4891" />
            <Segment presentationType="alternates" segmentType="neardup" label="urn:guid:00000000-0000-0000-0000-000000000224">
              <AssetRef reference="id-8_3213" priority="0.6412" />
              <AssetRef reference="id-9_3214" priority="0.6864" emphasis="1.0" />
            </Segment>
          </Segment>
          <Segment presentationType="sequential" segmentType="event" label="urn:guid:00000000-0000-0000-0000-000000000225">
            <AssetRef reference="id-10_3215" priority="0.4281" />
          </Segment>
        </Segment>
      </Segment>
    </Segment>
  </StoryBoard>
</Story>
``` potential physical or temporal placement in a hardcopy or softcopy output modality, respectively, so as to avoid giving high emphasis scores to too many adjacent or nearby images.

The following XML fragment illustrates the structure of a storyboard. This XML fragment follows the structure illustrated in FIG. 4. The XML document structure is generated by traversing the tree structure of FIG. 4 in a depth-first, pre-order manner. The first, outermost segment element corresponds to root segment 405 in FIG. 4; its child A storyboard may also indicate that some images are semantically equivalent, as illustrated by the alternates (alt.) segment 440 in FIG. 4 and by the XML Segment element with the presentationType "alternates" in the previous XML document fragment. In this case, each image may be assigned a priority, with the system selecting at most the highest priority image to include in any final representation in the preferred embodiment. Some visualizations may provide a means for the user to edit the created view-based representation. Such representations may use the grouping within the storyboard to enable the user to readily swap out a different image from the set of images deemed to be semantically equivalent.

Rather than use a strict priority score to determine which image from a set of semantically equivalent alternatives to include in a final view-based representation, some embodiments may leverage additional metadata, recorded or derived, as well as optionally user-provided metadata, to determine which image should be selected. For example, consider a view-based representation containing a group shot of six people, where several alternatives exist for that group shot. A viewer-sensitive view-based representation may prioritize a different representative image of the group shot depending on the viewer, so as to pick the version of the group shot that best features the viewer or people important to the viewer. Viewer information may be used at other steps in the process of generating the final view-based representation to prioritize or group assets in a manner most appropriate or tailored to a given viewer. The viewer's preferences may be known as part of a viewer profile, or they may be explicitly specified. For example, the viewer may indicate to the system that a particular person or set of people are of special importance to the viewer. More generally, a viewer's preferences or profile may be used to adjust the images selected for a particular view-based representation. To support this type of behavior, an embodiment of the present invention associates an asset manifest with the storyboard where the manifest includes in RDF format any asset metadata that might be useful in making final selection and rendering decisions.

Often, consumers prefer to arrange media assets in a manually constructed photo album according to groupings that are not strictly chronological. For example, a person may create a photo album with some pages organized in a thematic manner, such as pictures of a given location or person. Manually constructed photo albums may mix various types of groupings. For example, one will frequently find manually constructed photo albums to be predominantly organized in chronological order, but with thematic content inserted sporadically. A feature of the present invention models these types of real-world consumer behavior. The system provides for grouping within a storyboard, where the groups are determined by a variety of techniques beside chronology. For example, frequent itemset mining, face detection, face recognition, location clustering, object detection, event detection, and event recognition all could be the basis for grouping, either individually or in some combination. The system is capable of generating these and other types of groupings. Each grouping type has an appropriate algorithm for determining both the grouping and the associated priority.

A strictly thematic grouping is determined by detecting frequent itemsets in an expanded set of discretized image features. The frequent itemset mining algorithm described in U.S. Pat. No. 8,625,904 treats all features equally. However, features may vary in importance, and the relative importance of feature categories can be determined based on domain knowledge. For example, in consumer images, face-based features are considered to be very important, while color-based features may be of lower importance since there is no correlation between color and depicted object in many cases. According to an aspect of the present invention, the feature categories are assigned weights to indicate their importance in the consumer photo domain. In general, a theme may contain feature descriptors from multiple feature categories. For example, consider a multiyear set of multimedia assets containing pictures from multiple camping trips to the Adirondacks. That set of camping pictures might give rise to the theme {Location=Adirondacks, Season=Summer, Scene=NatureScene}. That same multiyear set may also contain pictures taken of the first day of school, such as a child posing in front of the school bus. A detected theme in that case might be {Color=yellow, Face=OnePerson, TimeOfDay=morning, TimeOfYear=September, Scene=outdoor}.

Table 1 shows example feature descriptors that are stored as metadata, which are divided into categories. FIG. 1 also shows a category-level weight that indicates the importance assigned to each category based on empirical observations. There may also be finer differences between features within a category. For example, of the face-based features, recognized people get the highest importance, followed by features based on the number of faces and the size of faces. The importance of each feature within a category may be further indicated by a feature-level weight (not shown in Table 1). The category-level weights shown in Table 1 are for illustrative purposes; the exact category-level and feature-level weights may depend on the application generating the storyboard. For example, a storyboard created to be shared via social media may assign a higher feature-level weight to the feature "3OrMoreFaces" than would be used by default.

TABLE 1

Example Feature Descriptors

| Feature Category | Example Feature Descriptors | Category-level Weight |
|---|---|---|
| Scene Class Features | NatureScene, CityBuildings, Beach, Outdoor/Indoor, Sunset | 0.6 |
| Materials Class Features | Sky, Snow, Water, FallFoliage, GreenFoliage, Text | 0.3 |
| Low-Level Features | Blue, Green, Red, Yellow, Pink, Purple, White | 0.3 |
| Face-based Features | OnePerson, GroupOf2, 3OrMoreFaces, SmallFace, LargeFace, Baby, Adult, Female, Male | 1.0 |
| Relational Features | Family, CloseRelative, Friend | 0.6 |
| Time-Based Features | TimeOfDay, TimeOfYear, TimeOfWeek | 0.2 |
| Capture Condition Features | Closeup, Backlight, Dark | 0.2 |
| Event-based Features | Event classification, Location | 0.6 |

The asset priority scores associated with individual assets in thematic groups are computed based on the features associated with the theme. The final asset priority score reflects how representative the image is of the thematic group in which it is placed, as well as the thematic group's importance. Different asset feature priority scores are computed based on feature category, and then these scores are combined to produce a final asset priority score for the image. According to one aspect of the present invention, feature priority scores are computed for the "materials class features" and "low-level features" categories as the fraction of the image that is covered by the material or low-level color/texture. For the face-based features, an average of the facial IVI indicating the quality of the faces detected is used as the asset feature priority score. For the remaining categories, the technical IVI score that indicates the quality of the image may be used as the asset feature priority score. The feature priority scores based on the features included in the theme are combined to produce the final asset priority score for each asset in the thematic grouping. For example, an asset from the theme of {Blue, GroupOf2} would have a low-level feature priority score component based on the extent of blue areas in the asset and a face-based feature priority score component based on the quality of the two faces detected in the asset. The asset's final asset priority score is computed as the weighted sum of the individual feature priority scores, where the weights are the category-level weights. By assigning an asset priority score to each asset in the group, the system maintains a prioritized ranking of the assets in the group to facilitate future rendering of alternative view-based representations. In other words, the asset priority score enables later methods in the system to choose the top assets from the group.

Similarly, each detected frequent itemset (thematic group) is assigned a thematic group priority score, which is computed as a function of the asset priority scores included in the thematic group. Appropriate functions used to calculate thematic group priority scores include average, median, and an average computed by excluding outlier values. A threshold may be set for a minimum thematic priority score that is required for the frequent itemset to be included in the final list of thematic groups.

The method described here for computing thematic group priority scores will generally result in thematic groups that include face-based features receiving a higher priority score than those thematic groups that include only time-based and content-based features. An itemset that is a combination of multiple features will generally have a higher score than one comprised of a single feature. Given the category weights of Table 1, in the absence of face-based features, multiple other features may be needed to exceed the minimum threshold priority score for inclusion in the final list.

According to another aspect of the present invention, the feature priority score indicates the confidence that the asset is correctly assigned that feature. For example, face detectors generate a confidence score that the detected face is an actual face; a Bayes net-based scene or material detector generates a confidence score indicating the strength of the belief that the output class is true. With respect to this feature, the thematic group priority score quantifies how confident the system is that the assets assigned to a thematic group actually comply with the thematic constraints of the group.

Regarding another aspect, user profile information may be used to determine the thematic group priority score. The user's preference for particular group(s) can be saved as a part of the user's profile. For example, a user may like a theme based on the "GroupOf2Faces" feature because it mostly captures his/her two children. Therefore, according to this aspect, the system notes this user preference and assigns a higher thematic group priority score to a theme based on this feature in the products the user creates in the future. The user preference is used in lieu of or in addition to the category-level weights. Instead of explicit validation by a user of his or her preferences, the system considers a theme to have a higher thematic group priority score if the user has previously included the automatically-generated thematic group in the final version of a product (photobook, calendar, etc.). Collecting statistics on the thematic groups (i.e., groupings of features) that are considered to be important across a large number of users can be used to identify themes that are common to many users. These groups can then be automatically assigned a higher thematic group priority score in the case of unknown users (those without a profile).

Maintaining a profile can facilitate the use of a "recommendation" system. The system maintains a record of the thematic groupings that are preferred (or used) by a first set of users. The system may determine that a particular set of thematic groups is shared by numerous users. For example, the first set of users may all have indicated a preference for the following set of thematic groupings: {{"Blue", "Green", "Foliage"}, {"Outdoor", "Summer", "Park"}, {"NoFaces", "Outdoor"}, {"Red", "Orange", "Sunset"}}, wherein {"Blue", "Green", "Foliage"} represents a thematic group. If a second user has these same thematic groupings in his or her collection, along with possibly other thematic groupings, and has thus far only shown a bias towards a subset of this set of thematic groups, then the system may recommend the remaining thematic groupings to the second user. If the second user has not yet shown a preference or bias towards particular thematic groupings, then the system may recommend the entire set of thematic groups to the second user. How the system makes recommendations to the user will depend upon the embodiment. According to one aspect, a graphical user interface is used to suggest to the user thematic groups that may be of interest to the user. According to other aspects of the invention, the system may recommend subsets of thematic groups to increase the scores of those groups when they are determined to appear in the user's collection.

Figure 5:
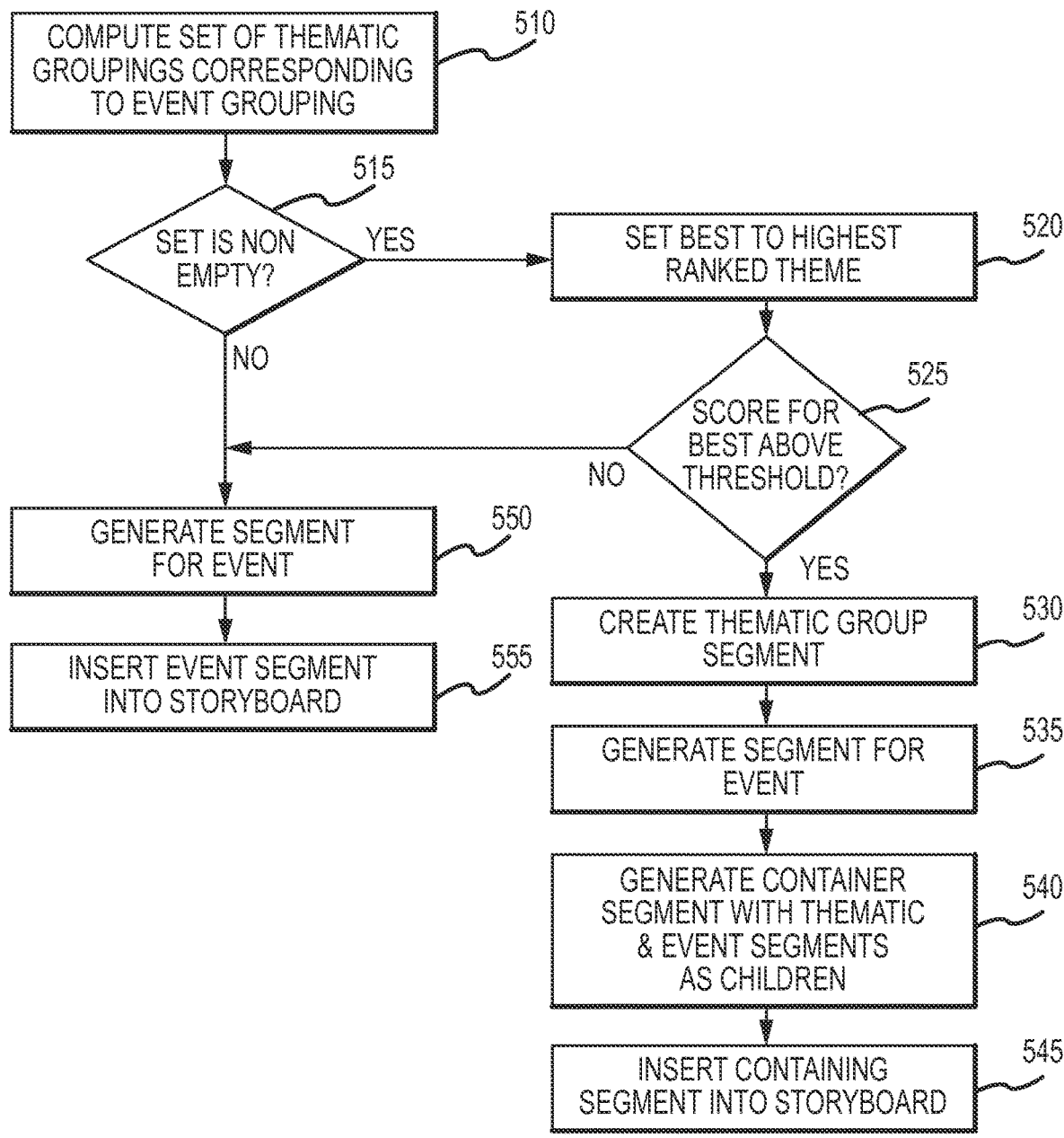
FIG. 5 illustrates an embodiment of a method for generating a hybrid storyboard.

The system generates storyboards wherein the content is predominantly grouped in chronological order, but where thematic groupings are inserted at appropriate locations. Such storyboards are referred to herein as "hybrid storyboards." The method for generating hybrid storyboards proceeds similarly to the method for generating storyboards from event-based groupings. However, for each event, an additional process is executed to determine if a theme-based summary segment should be generated. This is illustrated in FIG. 5. At step 510, the system computes the set of possible thematic groupings that correspond to the event. A feature of the invention provides that a frequent itemset mining method (as discussed previously) automatically prunes the search space to identify the most important thematic groupings, or featuresets so as not to compute the seemingly endless number of permutations of thematic groupings. The set of possible groupings is tested at step 515 to see if it is non-empty—that is, to determine if there exist thematic groupings that correspond to that event. If such groupings do not exist, then the system proceeds to steps 550 and 555 to generate groupings for the event by itself. If however such thematic groupings do exist, then the system proceeds to step 520 to select the best thematic grouping, according to the thematic group priority score.

If the best thematic grouping satisfies some threshold as determined in step 525, then the system proceeds to generate a segment containing the assets in the selected thematic grouping (step 530) as well as a segment corresponding to the event (step 535). The two segments are then combined under a new sequential segment at step 540 and inserted into the storyboard at step 545. In alternatives of this approach, the system may generate different storyboard structures, including omitting the containing segment or making the combining segment be parallel in nature. Note that the present invention is also capable of generating a thematic grouping that corresponds to the entire set of multimedia objects.

Referring back to FIG. 2B, the storyboard 270 provides a representation of the ordering, grouping, and prioritization results computed by the methods described previously. The present invention may use alternate mechanisms for representing and manipulating these results. According to this aspect, the system may also include emphasis score results. It should be understood that the ordering, grouping, and prioritization results may be modeled and optionally persisted (saved or recorded) in short-term or long-term storage independent of any particular view or output modality. This provides the advantage that a given storyboard can be used to create multiple view-based representations. For example, by storing a particular storyboard, it may be used first to create a 20-page 8×10 photobook, then a 40-page 12×8 photobook, and finally a 3-minute video slideshow. Each of these different view-based representations might possibly contain a different subset of the multimedia objects. The 20-page 8×10 photobook would typically be a condensed version of the 40-page 12×8 photobook, and the collage would likely be an even more heavily condensed version. The priority information contained within the storyboard provides a means to determine which multimedia assets to include in a particular representation. The sequential ordering in the storyboard naturally facilitates sequentially ordered pages and possibly, though not necessarily, sequentially ordered multimedia assets on a page. The video likewise would respect the sequential ordering. A video might show objects within a parallel segment (or grouping) in a sequential order, but not necessarily; a video might show such objects in parallel, such as pictures with a picture, as a grid of pictures, as a combination of simultaneously displayed slowly and rapidly changing pictures, or in some other arrangement known to those skilled in the video arts.

Figure 2C:
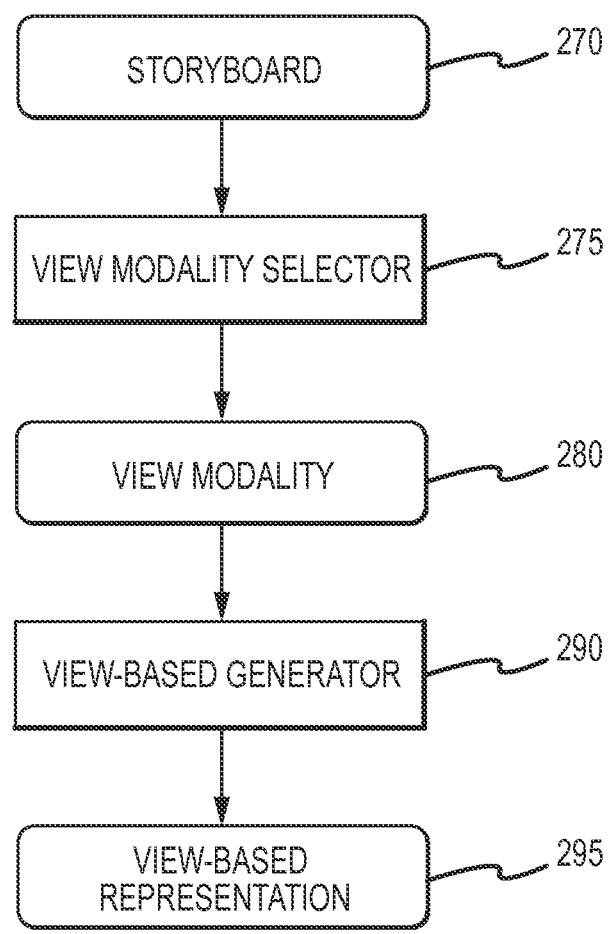
FIG. 2C illustrates how a storyboard is adapted into an output modality and a view-based representation of the same.

At step 275 of FIG. 2C, the system chooses an output modality 280. The choice could be dictated by an explicit user specification, such as the user selecting a particular output modality, e.g., an 8×10 photobook or video slideshow. The system may automatically create view-based representations on speculation for a user, in which case the choice of output modality may be algorithmically determined. Given a specified output modality 280, the system then generates at step 290 a view-based representation 295. Note that a given output modality may have associated parameters used to control the generation of the view-based representation. The specific parameters may vary depending on the output modality, although certain classes of output modalities may share common parameters. For example, output modalities corresponding to hardcopy photobooks will have parameters such as the minimum pictures per page, maximum pictures per page, and desired number of pictures per page, as well as possibly the minimum, maximum, and desired number of pages. Output modalities corresponding to softcopy output, such as a video, may have a parameter specifying the desired total length of display time of the output as well as parameters specifying the minimum and maximum amount of time each media asset included in the view-based representation should be displayed.

Figure 6:
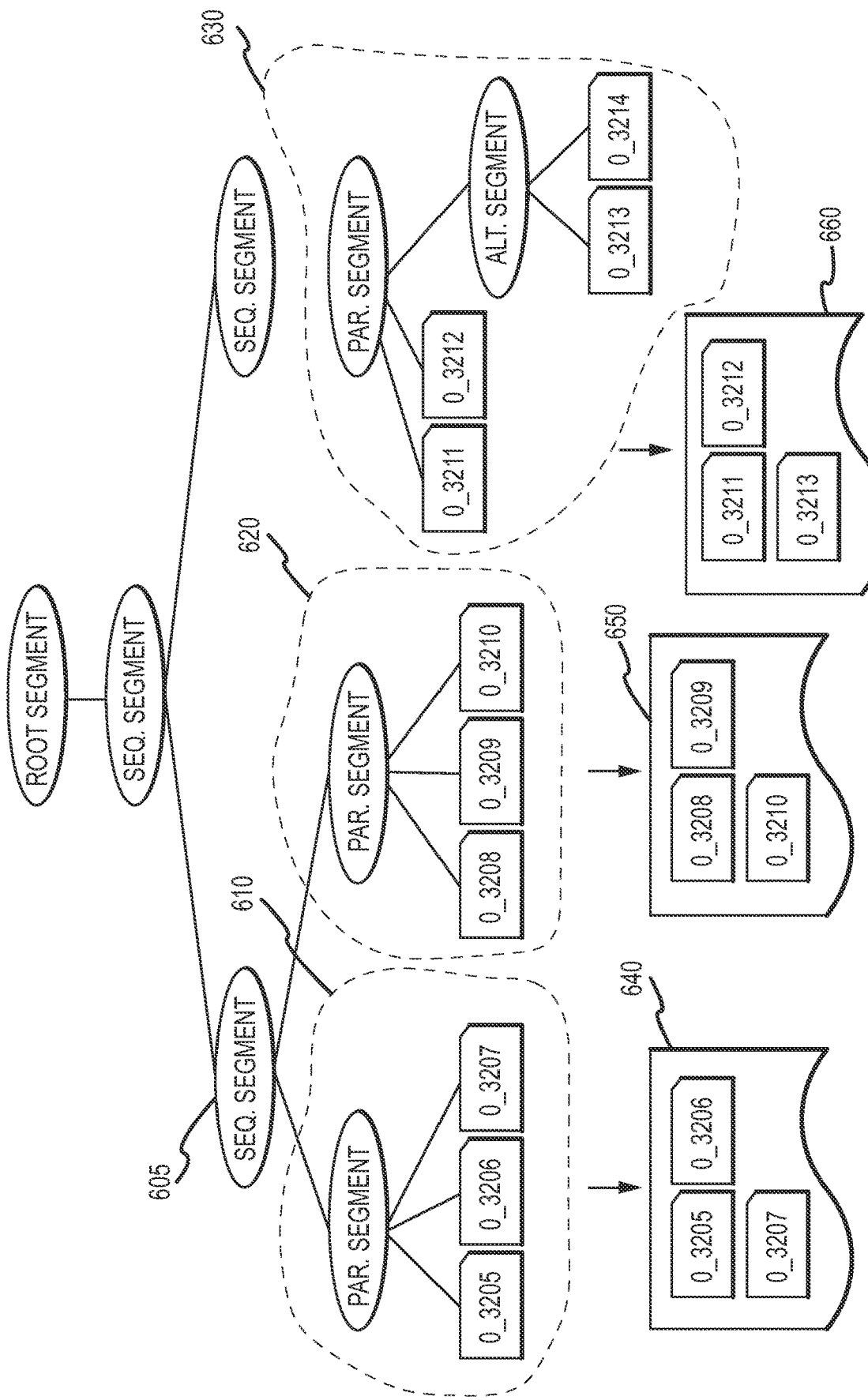
FIG. 6 illustrates an embodiment of mapping of a storyboard onto a set of view-based representations.

One aspect of the present invention for mapping storyboards to view-based representations supports a multiplicity of algorithms or methods for constructing the view-based representations. One facet of the invention allows the user to select which of the available methods should be employed. The general problem solved by all such methods is that the segment structure of the storyboard needs to be mapped to a series of distinct views. Conceptually, distinct parts of the hierarchical segment tree are mapped to different views. FIG. 6 illustrates an embodiment of mapping the storyboard structure shown in FIG. 4 to a set of views in a view-based representation. In this particular example, the sub-tree rooted at segment 610 is mapped to view 640, the sub-tree rooted at segment 620 is mapped to view 650, and the sub-tree rooted at segment 630 is mapped to view 660. Of course, different view mappings are possible. For hardcopy output modalities, the mapping is subject to the parameters previously mentioned. For example, if the maximum and desired number of pictures per page is 6, then the entire sub-tree rooted at segment 605 could be mapped to a single view. Conversely, if the maximum number of pictures per page is two, then each of the views shown in FIG. 6 would need to be split into two or more views.

The present invention may utilize two types of methods for mapping storyboards to view-based representations. One type of method uses the priority information specified in the storyboard to determine a subset of the media assets to include in the view-based representation. This method computes a priority cut-off threshold to determine which assets should be included in the mapping. In this method, only assets whose priority exceeds the threshold are included. The threshold is selected so as to satisfy the specified parameters such as the desired number of pages (views) and the desired number of media assets to include per view. The system may determine a fixed threshold, but it may also provide more flexible thresholds. For example, it may be permissible to include lower priority assets than would otherwise be included in a given view if that would make the view more aesthetically pleasing according to aesthetic measures used by the embodiment. Likewise, it may be permissible or even desirable to omit higher priority assets from a particular view if doing so helps satisfy the specified constraints of the particular output modality. As noted previously, the preferred embodiment associates with the storyboard a manifest containing sufficient additional metadata to enable such determinations.

The second method of mapping storyboards to view-based representations uses all of the media assets within the storyboard; prioritization data is not considered. The number of assets included in a given view of the view-based representation may therefore vary more widely in this approach than it would under a method that applies priority-based asset selection. For example, if the output modality is a hardcopy photo album and the media set is large, then some pages may end up with a very large number of pictures on a page. This method would be appropriate when the user wants to see all of the assets in their media collection in the final view-based representation. In either method, the emphasis score determines how much space should be allocated to a given asset.

A user may either select a specific mapping method or allow the system to automatically choose an appropriate method based upon the characteristics of the multimedia collection, the storyboard, and the desired output modality.

The problem of dividing up a series of media assets into views is not unlike the problem of determining an optimal breaking of a series of words in a paragraph into lines in a column of text. The preferred embodiment employs a dynamic programming algorithm analogous to the algorithm described in Donald E. Knuth and Michael F. Plass, "Breaking Paragraphs into Lines," *Software—Practice and Experience*, Vol. 11, pp. 1119-1184. 1981.

Certain hardcopy output modalities such as duplex photobooks provide additional constraints on the nature of views. A duplex photobook consists of spreads of facing pages. Each spread may be considered to be a separate view. However the pages within a spread may also be considered as views. Typically, users expect the content on a spread of a photobook to all be related, although perhaps not as tightly related as the content within a page. Consequently, one feature provides that when generating view-based representations for duplex photobooks, some of the supported methods proceed in two phases. In the first phase, the content is split into views corresponding to each spread. In the second phase, each view corresponding to a spread is further split into two views corresponding to the facing pages. This approach could be readily extended to accommodate spreads containing more than two pages, as would be present in a photobook with centerfolds.

Figure 7:
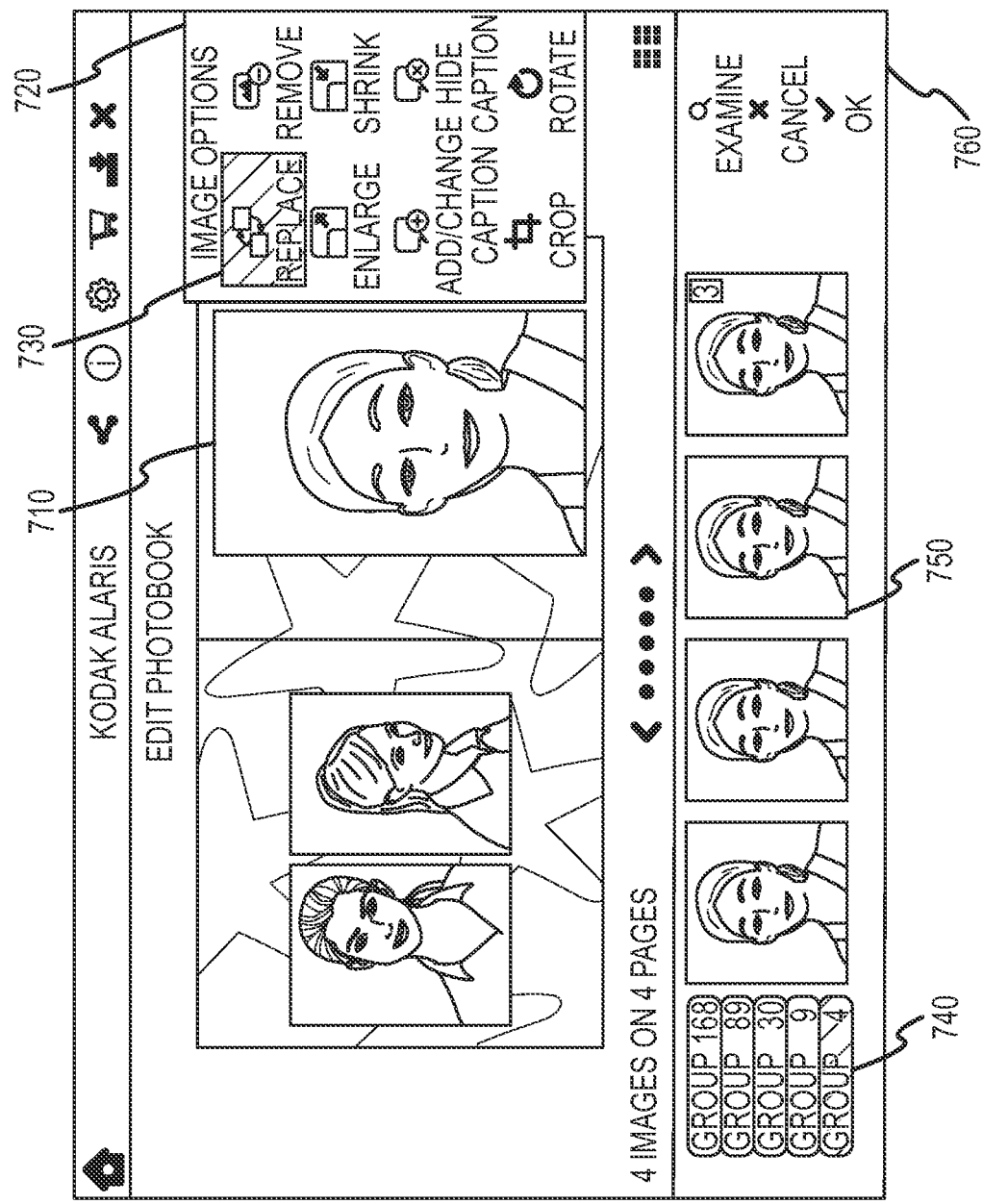
FIG. 7 illustrates a means for the user to edit a view-based representation.

Another feature of the present invention provides a means for the user to select any picture in the final view-based representation and to view alternative images at different levels of the hierarchy. In particular, referring back to FIG. 1, the viewer 160 provides a means for the user to preview and edit views before they are printed. The viewer has access to the storyboard that generated the view, and is therefore able to expose to the user aspects of the order, grouping, and prioritization. It should be understood that a user is a person that uses the present invention to create a storyboard, while a viewer is a person that uses the present invention to view the view-based representations created from the storyboard. A user and a viewer can be different people or a user and a viewer can be they can be the same person. FIG. 7 illustrates a means for the user to edit a view-based representation. In this case, the user is editing a photobook by replacing an image with a preferred alternate image. The user selects a picture in the photobook 710 and is presented with a palette of icons representing appropriate operations on that image 720. The user selects the "Replace" icon and is presented with a set of hierarchical groupings 740 corresponding to that image. Individual groupings may provide a description and indication of the size of the respective group. The set of images associated with the selected grouping are displayed for the user at preview grouping view 750. The user completes the edit by double clicking the desired replacement image or by clicking on a control icon 760. The set of hierarchical groupings illustrated in FIG. 7 are displayed as an ordered list, however, those skilled in the art will readily recognize that alternative representations are possible such as tree structures and unordered lists.

Figure 8:
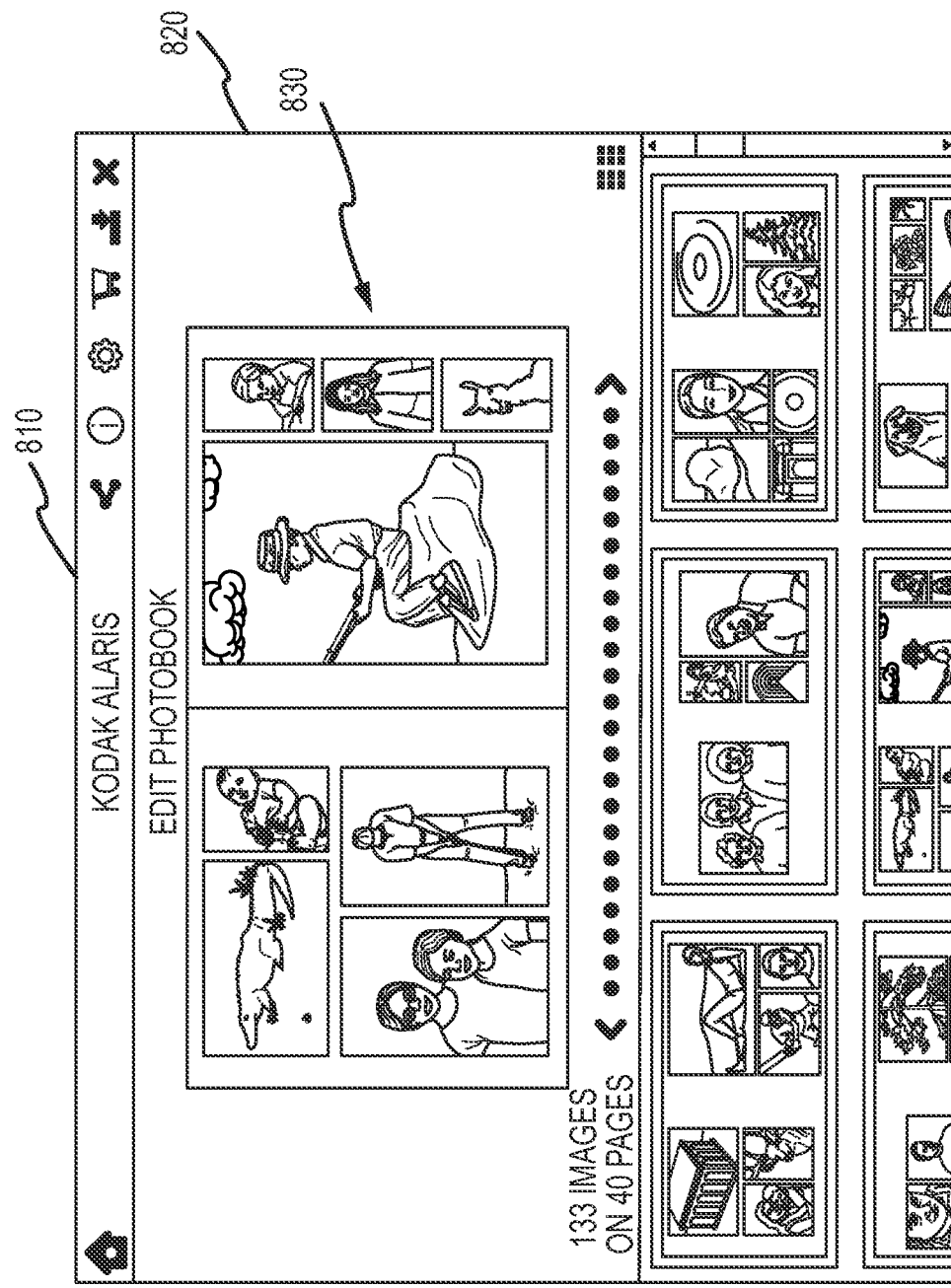
FIG. 8 illustrates a viewer screen for viewing view-based representations.

FIG. 8 illustrates a viewer screen for viewing view-based representations. In this case, the view-based representation corresponds to a multipage photo album. Screen region 810 contains an upper region 820 showing a current view—a spread from a photobook—and a lower region 840 showing thumbnail versions of other views within the view-based representation.

The invention has been described in detail with particular reference to certain preferred embodiments thereof, but it will be understood that variations and modifications can be effected within the spirit and scope of the invention.

The invention claimed is:

1. A method, comprising:
   storing multimedia assets on a computer storage device, wherein the multimedia assets comprise still digital images and each still digital image comprises recorded metadata and user-provided metadata, wherein the recorded metadata is generated by a camera at a time the multimedia assets are captured by the camera, and wherein the recorded metadata is associated with the multimedia assets at the time the multimedia assets are captured by the camera;
   extrapolating derived metadata from the recorded metadata and the user-provided metadata, by a computer processor;
   organizing the multimedia assets into one or more groupings, based on the recorded metadata and the user-provided metadata, by the computer processor;
   detecting faces in the multimedia assets, wherein each detected face is associated with an identity, by the computer processor;
   determining people importance scores for the multimedia assets based on the respective identities of the detected faces in each multimedia asset, wherein the people importance scores are directly proportional to a frequency that the respective identities of the detected faces appear throughout all of the multimedia assets, by the computer processor;
   prioritizing the one or more groupings, by the computer processor;
   prioritizing the multimedia assets in each of the one or more groupings based on the people importance scores, by the computer processor;
   receiving a selection of an output modality, wherein the output modality represents a consumer photo product that incorporates one or more of the multimedia assets;
   selecting one or more of the multimedia assets from a most prioritized grouping of the one or more groupings, based on the prioritization of the multimedia assets, for incorporation into the output modality; and
   generating and displaying on a display a view-based representation of the output modality incorporating the selected one or more multimedia assets.

2. The method of claim 1, further comprising saving on the computer storage device the prioritization of the multimedia assets independently of a selected output modality.

3. The method of claim 1, further comprising generating and displaying the view-based representation of the multimedia assets composited pursuant to emphasis scores assigned to the multimedia assets, wherein the emphasis scores are directly proportional to the amount of space each respective multimedia asset is allotted in the view-based representation.

4. The method of claim 1, wherein grouping the multimedia assets is performed according to a technique selected from the group consisting of: chronology, frequent itemset mining, location clustering, object detection, object recognition, event detection, and event recognition.

5. The method of claim 4, further comprising ordering the multimedia assets into a hierarchical arrangement based on the grouping of the multimedia assets, by the computer processor.

6. The method of claim 1, further comprising grouping the multimedia assets that are semantically equivalent, based on the recorded metadata and the derived metadata.

7. The method of claim 6, wherein grouping the multimedia assets that are semantically equivalent is based on one or more of the following classes of grouping data: temporal, location, and visual similarity.

8. The method of claim 7, wherein the visual similarity class of grouping data is determined by comparing block-based color histograms.

9. The method of claim 5, wherein the hierarchical arrangement is configured to arrange the multimedia assets in sequential order, based on the time each multimedia asset was captured by the camera.

10. The method of claim 1, wherein a graphic user interface is provided on the display comprising the view-based representation.

11. The method of claim 10, wherein the graphic user interface indicates a size of any groupings of the multimedia assets in the view-based representation.

12. The method of claim 1, wherein the output modality is selected from the group consisting of: a multimedia presentation, an interactive multimedia presentation, a photobook, a printed collage, a virtual collage, or a digital slide show.

13. The method of claim 1, further comprising identifying a plurality of thematic sets, wherein each of the thematic sets is determined from the derived metadata and wherein each thematic set comprises a subset of the multimedia assets, by a computer processor.

14. The method of claim 1, wherein the derived metadata comprises one or more of the following metadata types: a frequency of sharing the multimedia asset with others, a number of sharing recipients, and a number of social media interactions with the multimedia asset.

15. A method, comprising:
- storing multimedia assets on a computer storage device, wherein the multimedia assets comprise still digital images;
- storing recorded metadata and user-provided metadata on the computer storage device, wherein the recorded metadata and the user-provided metadata are associated with the still digital images, and wherein the recorded metadata is generated by a camera at a time the still digital images are captured by the camera;
- extrapolating derived metadata from the recorded metadata and the user-provided metadata, by a computer processor;
- organizing the multimedia assets into one or more groupings based on the recorded metadata and the user-provided metadata, by the computer processor;
- detecting faces in the multimedia assets, wherein each detected face is associated with an identity, by the computer processor;
- determining using the processor to determine people importance scores for the multimedia assets based on the respective identities of the detected faces in each multimedia asset, wherein the people importance scores are directly proportional to a frequency that the respective identities of the detected faces appear throughout all of the multimedia assets, by the computer processor;
- prioritizing first the multimedia assets in each grouping based on the people importance scores, by the computer processor;
- prioritizing second the one or more groupings, by the computer processor;
- generating a storyboard, wherein the storyboard comprises a hierarchical arrangement of the one or more groupings;
- mapping the storyboard as a view-based representation according to a selected output modality, wherein the selected output modality represents a consumer photo product that incorporates one or more of the multimedia assets in accordance with the storyboard; and
- rendering on a display the view-based representation.

16. The method of claim 15, wherein the user-provided metadata comprises metadata provided by a user via an interface located on an image capture device or via an image editing application.

17. The method of claim 15, wherein extrapolating, by the computer processor, derived metadata comprises applying one or more of the techniques chosen from the group consisting of: temporal event clustering, geographic naming, scene classification, materials class extraction, low-level feature extraction, content-based image retrieval, face detection, face recognition, facial clustering, semantic event clustering, image value indexing, and video key frame extraction.

18. The method of claim 15, wherein the user-provided metadata comprises metadata indicating a multimedia asset preference recorded by one or more users via a social networking application.

19. The method of claim 15, wherein the multimedia assets are organized into the one or more groupings according to a chronological paradigm.

20. The method of claim 15, wherein the multimedia assets are organized into the one or more groupings according to a thematic paradigm.

21. The method of claim 15, wherein the multimedia assets in the one or more groupings according to a hybrid chronological-thematic paradigm.

22. The method of claim 15, wherein the one or more groupings comprise sequential segments and parallel segments.

23. The method of claim 15, wherein the multimedia assets are organized into the one or more groupings by similar events depicted in the multimedia assets and according to a chronological paradigm of the events depicted in the multimedia assets.

24. The method of claim 15, wherein the output modality is selected from the group consisting of hardcopy print media and softcopy digital presentation.

25. The method of claim 15, further comprising first prioritizing the multimedia assets in each grouping, as a function of the recorded metadata, the user-provided metadata, and the derived metadata, by the processor.

26. The method of claim 15, wherein organizing the multimedia assets into the one or more groupings comprises using a frequent itemset mining algorithm configured to create thematic groupings of the multimedia assets, by the computer processor;
- wherein the thematic groupings are defined by a pre-established feature category and a feature descriptor, the feature descriptor being a subordinate classification of the feature category; and
- wherein the multimedia assets are first prioritized according to an asset priority score for the multimedia assets in the thematic groupings, the priority score being a function of the multimedia assets' fulfillment of the feature descriptor.

* * * * *